(12) United States Patent
Chiu (10) Patent No.: US 12,093,471 B1
(45) Date of Patent: Sep. 17, 2024

(54) TOUCHPAD AND BACKLIGHT MODULE THEREOF

(71) Applicant: Chicony Power Technology Co., Ltd., New Taipei (TW)

(72) Inventor: Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/211,427

(22) Filed: Jun. 19, 2023

(30) Foreign Application Priority Data

May 5, 2023 (TW) ................................. 112116881

(51) Int. Cl.
*G06F 3/0354* (2013.01)
*G06F 1/16* (2006.01)

(52) U.S. Cl.
CPC ........ *G06F 3/03547* (2013.01); *G06F 1/1692* (2013.01)

(58) Field of Classification Search
CPC .... G02B 6/0041; G02B 6/0043; G02B 6/005; G02B 6/0055; G02B 6/006; G02B 6/0073; G02B 6/0076; G02B 6/0036; G02B 6/0086; G06F 1/1673; G06F 1/169; G06F 3/042
See application file for complete search history.

(56) References Cited

U.S. PATENT DOCUMENTS

| | | | |
|---|---|---|---|
| 6,861,789 B2 | 3/2005 | Wei | |
| 9,620,485 B2 | 4/2017 | Wang et al. | |
| 10,990,790 B2 * | 4/2021 | Chien | G06V 40/1318 |
| 2010/0271839 A1 * | 10/2010 | Chan | H01H 13/83 |
| | | | 362/602 |
| 2012/0050651 A1 | 3/2012 | Huang et al. | |
| 2012/0212975 A1 | 8/2012 | Masuda | |
| 2014/0349423 A1 | 11/2014 | Lo et al. | |
| 2021/0063632 A1 * | 3/2021 | Ho | G06F 3/042 |
| 2021/0356642 A1 * | 11/2021 | Yao | G02B 6/0073 |

FOREIGN PATENT DOCUMENTS

| | | |
|---|---|---|
| CN | 202176982 | 3/2012 |
| CN | 205168017 | 4/2016 |
| CN | 105974663 | 9/2016 |
| TW | 201104315 | 2/2011 |
| TW | 201416946 | 5/2014 |

* cited by examiner

*Primary Examiner* — Nelson M Rosario
(74) *Attorney, Agent, or Firm* — Andrew M. Calderon; Calderon Safran & Wright, PC (57) ABSTRACT

A touchpad and a backlight module are provided. The backlight module includes a circuit board, a first light emitting element and a second light emitting element respectively located on two surfaces of the circuit board, a bottom layer, and a second light guide plate having a second microstructure, a middle layer having a light transmitting region and a first light guide plate having a first microstructure sequentially disposed on the bottom layer. A position of the second microstructure corresponds to the light transmitting region. An area of the light transmitting region of the middle layer is smaller than or equal to an area of the first microstructure. The first light emitting element corresponds to a side surface of the first light guide plate. The second light emitting element corresponds to a side surface of the second light guide plate.

20 Claims, 11 Drawing Sheets

TOUCHPAD AND BACKLIGHT MODULE THEREOF

CROSS-REFERENCE TO RELATED APPLICATION

This non-provisional application claims priority under 35 U.S.C. § 119(a) to Patent Application No. 112116881 filed in Taiwan, R.O.C. on May 5, 2023, the entire contents of which are hereby incorporated by reference.

BACKGROUND

Technical Field

The disclosure relates to a touchpad and a backlight module thereof, in particular to a touchpad having three light emitting modes and a backlight module thereof.

Related Art

In a backlight module, after the light source emits light into the light guide plate, light is uniformly emitted from the light exit surface of the light guide plate after being reflected and refracted by the light guide plate. Typically, the backlight module only has one light emitting mode in which the whole surface of the light guide plate emits light or the whole surface of the light guide plate does not emit light, and hardly has other light emitting modes. Therefore, the backlight module needs to be improved.

SUMMARY

According to some embodiments of the disclosure, provided is a backlight module, including a first light guide plate, a middle layer, a second light guide plate, a bottom layer, a circuit board, a first light emitting element and a second light emitting element. The first light guide plate has a first microstructure. The middle layer is attached to a bottom portion of the first light guide plate. The middle layer has a light transmitting region. The second light guide plate is attached to a bottom portion of the middle layer and has a second microstructure. A position of the second microstructure corresponds to the light transmitting region of the middle layer. An area of the light transmitting region of the middle layer is smaller than or equal to an area of the first microstructure. The bottom layer is attached to a bottom portion of the second light guide plate. The first light emitting element is located on a surface of the circuit board and corresponds to a side surface of the first light guide plate. The second light emitting element is located on an other surface of the circuit board and corresponds to a side surface of the second light guide plate.

Thereby, when only the first light emitting element emits light, the light emitted by the first light emitting element passes through the first light guide plate and interacts with the first microstructure to provide a first light emitting mode. When only the second light emitting element emits light, the light emitted by the second light emitting element passes through the second light guide plate and interacts with the second microstructure to provide a second light emitting mode. When the first light emitting element and the second light emitting element emit light at the same time, the light emitted by the first light emitting element and the second light emitting element at the same time respectively passes through the first light guide plate and the second light guide plate and respectively interacts with the first microstructure and the second microstructure to jointly provide a third light emitting mode. According to some embodiments, the area of the first microstructure is greater than the area of the second microstructure, so the first light emitting mode with a larger light emitting range, the second light emitting mode with a smaller light emitting range, and the third light emitting mode with overlapped light emission can be presented.

According to some embodiments, the first light guide plate has a first length in a first direction, and the second light guide plate has a second length in the first direction. The first length is the same as the second length.

According to some embodiments, the first light guide plate has a third length in a second direction perpendicular to the first direction, and the second light guide plate has a fourth length in the second direction. The third length is the same as the fourth length.

According to some embodiments, the first light guide plate has a third length in a second direction perpendicular to the first direction, and the second light guide plate has a fourth length in the second direction. The third length is smaller than the fourth length, or the third length is greater than the fourth length.

According to some embodiments, in a direction perpendicular to the two surfaces of the circuit board, the first light emitting element and the second light emitting element do not overlap.

According to some embodiments, the backlight module further includes a second light shielding adhesive. The second light guide plate has a second extending portion close to the second light emitting element, and the second light shielding adhesive is attached between the second extending portion and the circuit board.

According to some embodiments, a length of the middle layer in the second direction is the same as the third length of the first light guide plate or the fourth length of the second light guide plate.

According to some embodiments, one side end of the middle layer is adjacent to one side end of the circuit board or the side end of the middle layer is laminated on one surface of the circuit board.

According to some embodiments of the disclosure, provided is a touchpad, including a touch circuit board, a backlight module and a cover plate. The backlight module is arranged on a top portion of the touch circuit board. The cover plate is located on a top portion of the backlight module. The backlight module includes a first light guide plate, a middle layer, a second light guide plate, a bottom layer, a circuit board, a first light emitting element and a second light emitting element. The first light guide plate has a first microstructure. The middle layer is attached to a bottom portion of the first light guide plate. The middle layer has a light transmitting region. The second light guide plate is attached to a bottom portion of the middle layer. The second light guide plate has a second microstructure. A position of the second microstructure corresponds to the light transmitting region of the middle layer, and an area of the light transmitting region of the middle layer is smaller than or equal to an area of the first microstructure. The bottom layer is attached to a bottom portion of the first light guide plate. The first light emitting element is located on a surface of the circuit board and corresponds to a side surface of the first light guide plate. The second light emitting element is located on an other surface of the circuit board and corresponds to a side surface of the second light guide plate.

According to some embodiments, the light transmitting region of the middle layer is smaller than the touch circuit board. An area of the first light guide plate is greater than an area of the cover plate, and an area of the second light guide plate is greater than the area of the cover plate.

DETAILED DESCRIPTION

Various embodiments of the disclosure will be disclosed in the accompanying drawings. For the sake of clarity, many practical details will be explained in the following description. However, it should be understood that these practical details should not be used to limit the disclosure. In addition, in order to simplify the drawings, some conventional structures and elements will be shown in the drawings in a simple and schematic way. It is to be particularly noted that the drawings are for illustrative purposes only and do not represent the actual dimensions, quantities and scales of the elements. Some of the details may not be fully drawn in order to facilitate the simplicity of the drawings.

Figure 1:
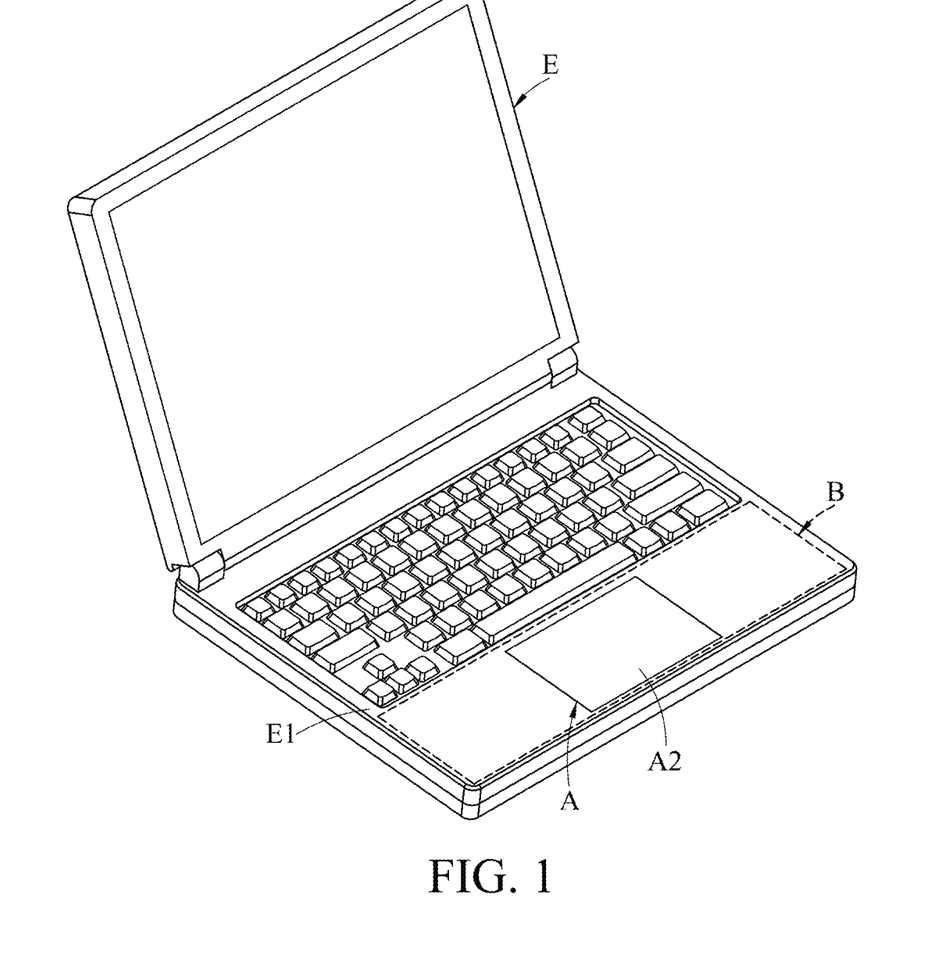
FIG. 1 is a schematic view of an embodiment of a touchpad applied to an electronic device.
Figure 2:
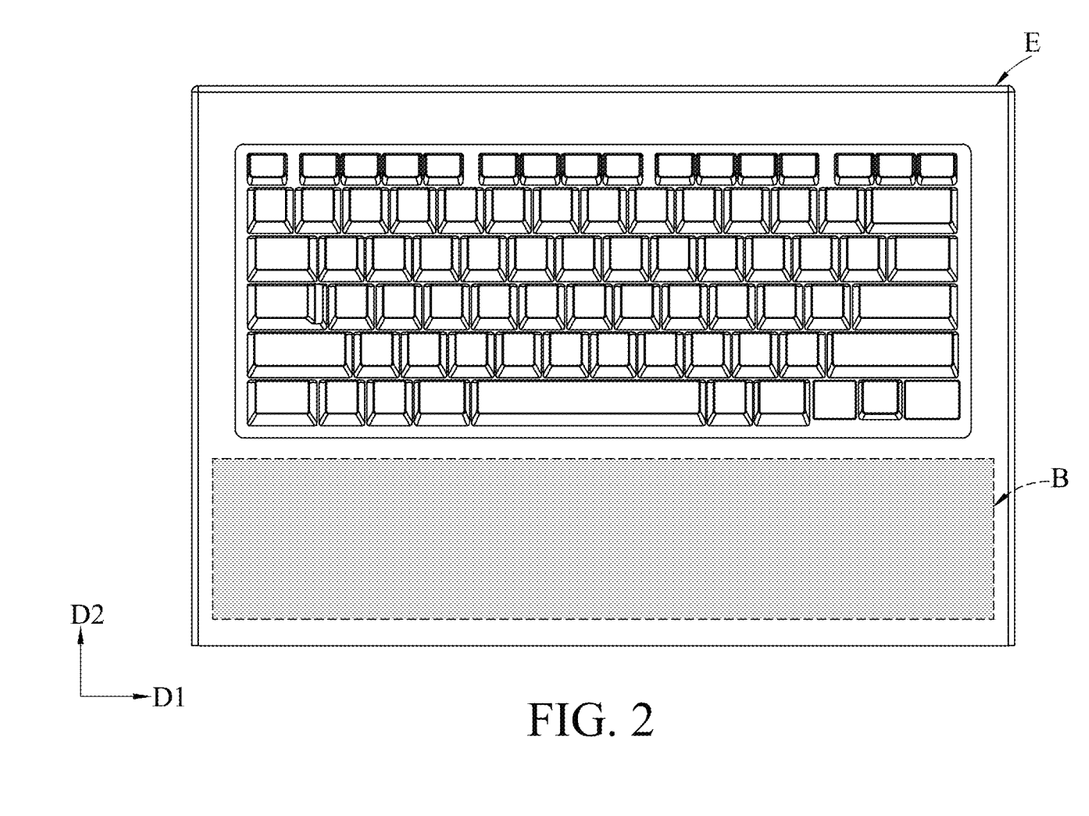
FIG. 2 is a schematic view of the touchpad providing a first light emitting mode through a backlight module.
Figure 3:
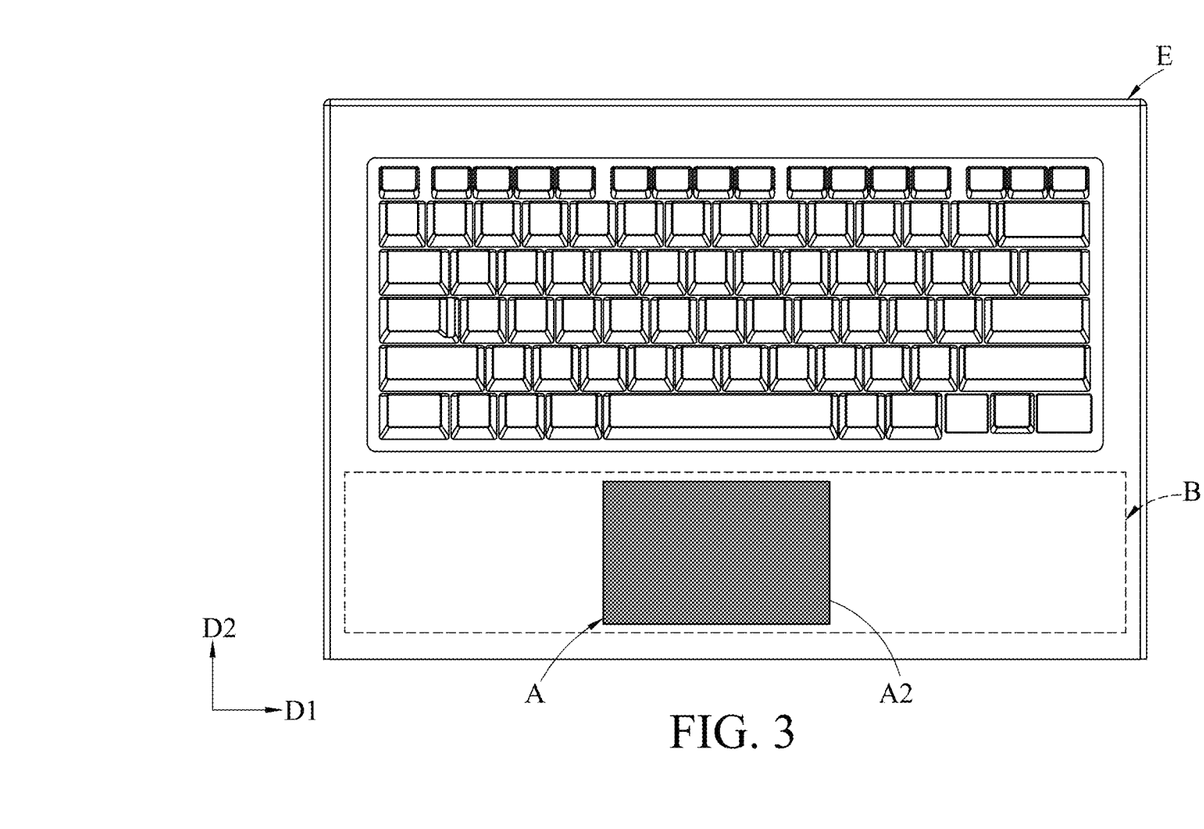
FIG. 3 is a schematic view of the touchpad providing a second light emitting mode through the backlight module.
Figure 4:
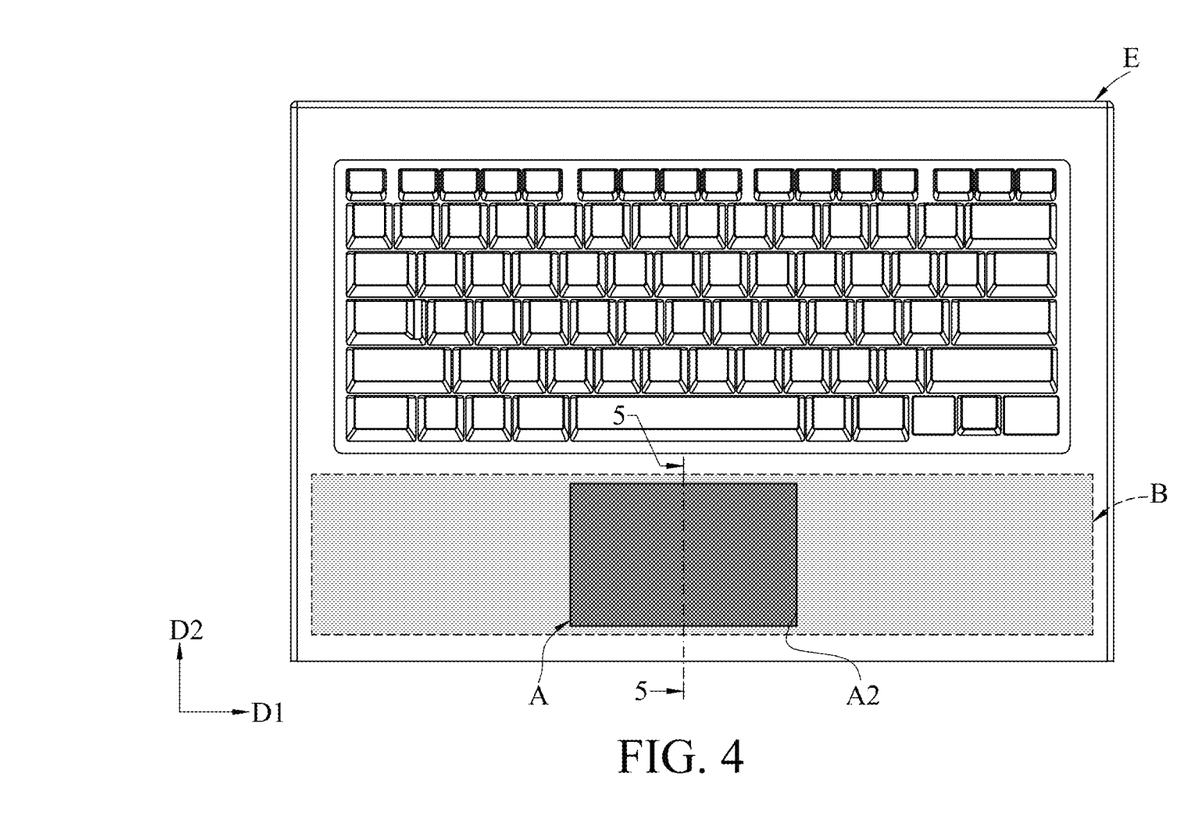
FIG. 4 is a schematic view of the touchpad providing a third light emitting mode through the backlight module.

Referring to FIG. 1 to FIG. 4, FIG. 1 is a schematic view of an embodiment of a touchpad A applied to an electronic device E. FIG. 2 is a schematic view of a touchpad A providing a first light emitting mode through a backlight module B. FIG. 3 is a schematic view of the touchpad A providing a second light emitting mode through the backlight module B. FIG. 4 is a schematic view of the touchpad A providing a third light emitting mode through the backlight module B.

Referring to FIG. 1 to FIG. 4, in some embodiments, the touchpad A includes the backlight module B and can be applied to the electronic device E. The backlight module B can provide a first light emitting mode (as shown in FIG. 2), a second light emitting mode (as shown in FIG. 3) and a third light emitting mode (as shown in FIG. 4) with different light emitting effects. The first light emitting mode has the whole surface light emitting range including the touchpad A and surroundings thereof, as shown by the light gray area (which actually may have single-color or multi-color light emitting effect) in FIG. 2. The second light emitting mode has the light emitting range including the touchpad A, as shown by the dark gray area (which actually may have single-color or multi-color light emitting effect) in FIG. 3. The third light emitting mode has the light emitting range including the touchpad A and surroundings thereof, as shown by both the light gray area and the dark gray area in FIG. 4. In this way, when in use, the backlight module is adapted to illuminate the partial or whole range of the touchpad A, which is convenient for users to see and operate and can provide a dazzling effect. The backlight module B may be applied to, but not limited to, a display of a television, a monitor, a laptop, a tablet or a mobile phone.

Figure 5:
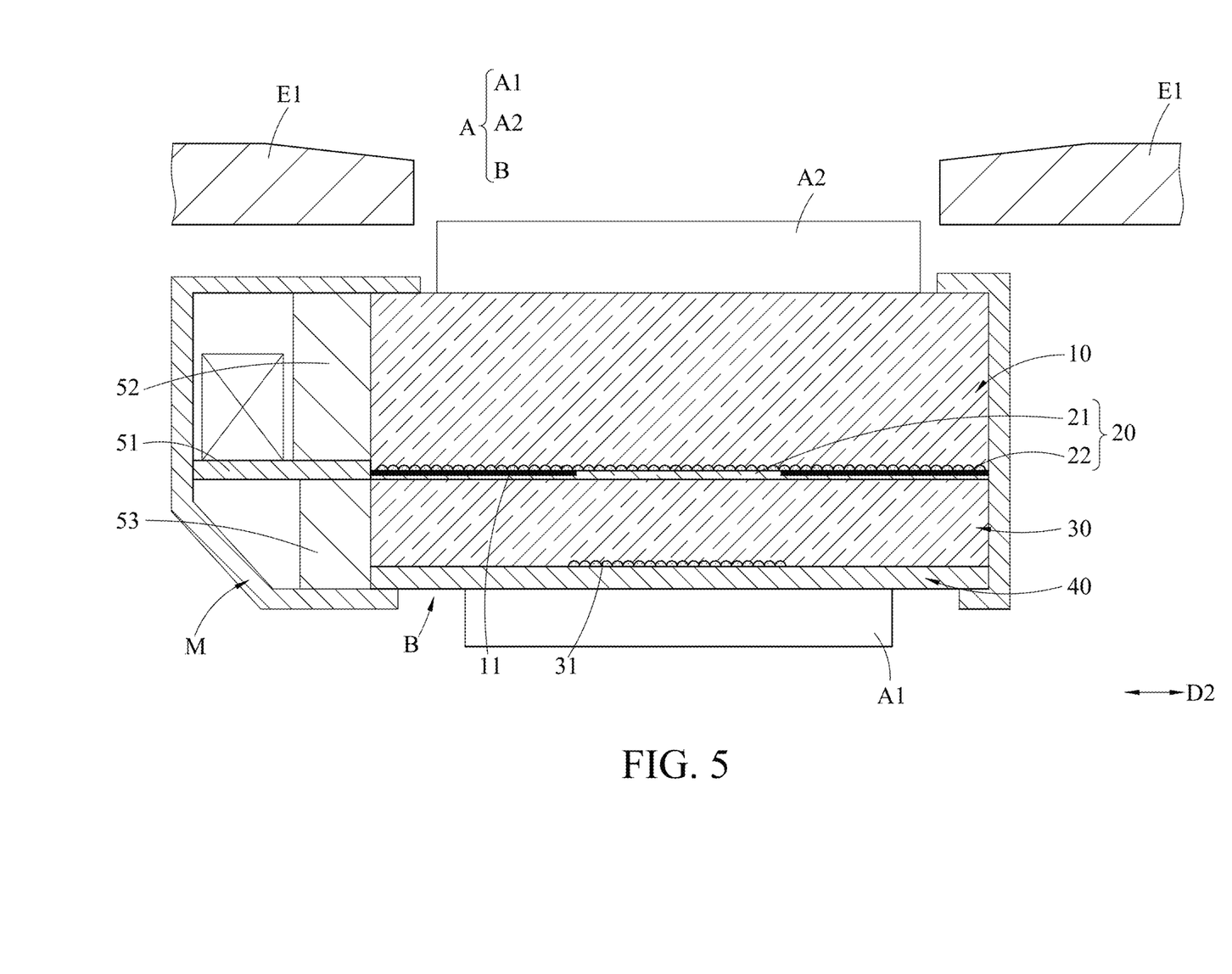
FIG. 5 is a schematic cross-sectional view of a first embodiment of the touchpad in FIG. 4 taken along line 5-5.

Referring to FIG. 5, FIG. 5 is a schematic cross-sectional view of a first embodiment of the touchpad in FIG. 4 taken along line 5-5. The backlight module B includes a first light guide plate 10, a middle layer 20, a second light guide plate 30, a bottom layer 40, a circuit board 51, a first light emitting element 52 and a second light emitting element 53. The first light guide plate 10, the middle layer 20, the second light guide plate 30 and the bottom layer 40 are sequentially laminated and arranged on one side of the circuit board 51, and the first light emitting element 52 and the second light emitting element 53 emit light toward the first light guide plate 10 and the second light guide plate 30 to provide the light emitting effect. It should be noted that in some embodiments shown in FIG. 5, the first light guide plate 10 of the backlight module B is on the top side relative to the bottom layer 40, and the bottom layer 40 is on the bottom side relative to the first light guide plate 10.

Referring to FIG. 1 in conjunction with FIG. 5, in some embodiments, the touchpad A includes a touch circuit board A1, the backlight module B and a cover plate A2. The backlight module B is arranged between the touch circuit board A1 and the cover plate A2. The cover plate A2 is arranged on a top side of the backlight module B, and the touch circuit board A1 is arranged on a bottom side of the backlight module B. When the touchpad A is applied to the electronic device E, the electronic device E includes a shell E1. When the backlight module B is not emitting light, the electronic device E presents the exterior color of the shell E1 itself. The touchpad A is arranged in the shell E1, and the cover plate A2 of the touchpad A is exposed out of the shell E1 for the user to operate. In the embodiment shown in FIG. 1, the electronic device E is a notebook computer. The shell E1 is a case of the notebook computer, and the touchpad A is a touchpad of a host of the notebook computer, but the disclosure is not limited thereto.

Referring to FIG. 5, in some embodiments where the backlight module B is applied to the touchpad A, areas of the first light guide plate 10 and the second light guide plate 30 are respectively greater than an area of the cover plate A2, thereby ensuring the whole surface of the cover plate A2 to emit light.

Figure 6:
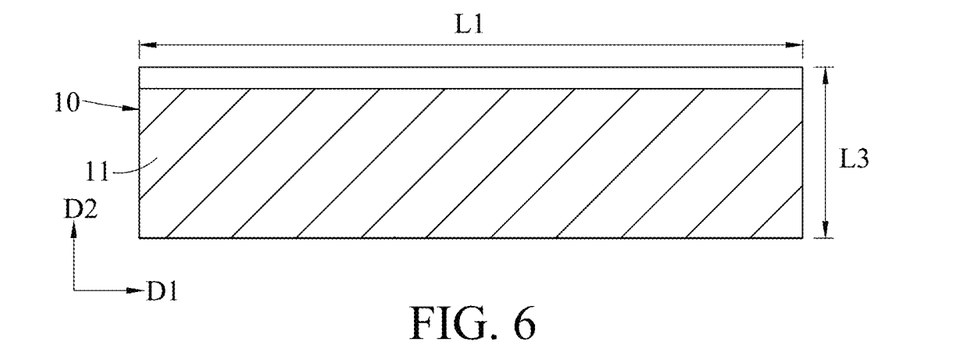
FIG. 6 is a schematic view of an embodiment of a first light guide plate of the backlight module.

Referring to FIG. 2, FIG. 5 and FIG. 6, FIG. 6 is a schematic view of an embodiment of a first light guide plate 10 of the backlight module B. The first light guide plate 10 has a first microstructure 11 (shaded area shown in FIG. 6). The first microstructure 11 of the first light guide plate 10 is configured to change the direction of reflection of light and guide the light entering the first light guide plate 10 to the required light exit direction to provide a light emitting area with a predetermined shape or size. In some embodiments, the shape and size of the first microstructure 11 distributed on the first light guide plate 10 are associated with the light emitting shape and size of the first light emitting mode.

In some embodiments, the first microstructure 11 is realized by mesh dots or mesh lines printed with ink on a bottom surface of the first light guide plate 10. In some embodiments, the first microstructure 11 may also be formed by a plurality of dots (or mesh dots or light dots), which may be, but not limited to, convex dots or concave dots, and may be of any shape, e.g., an irregular shape, a cone, a square, a triangle, a trapezoid, etc. In these embodiments, the shape and size of the dots, the spacing between the adjacent convex dots, and/or the spacing between the concave dots may be adjusted according to the type of light emitted by the first light emitting mode of the backlight module B or a material of the first light guide plate 10. Thereby, the first light guide plate 10 receives the light emitted from the first light emitting element 52, so that the light of the first light emitting element 52 enters the first light guide plate 10 from the side for total reflection, and is scattered by the first microstructure 11 to provide the predetermined light emitting effect.

Figure 7:
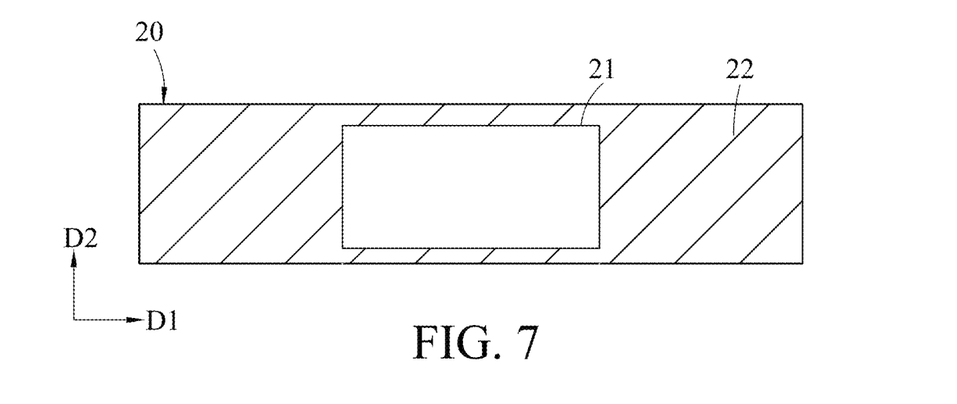
FIG. 7 is a schematic view of an embodiment of a middle layer of the backlight module.

Referring to FIG. 2, FIG. 3, FIG. 5 and FIG. 7. FIG. 7 is a schematic view of an embodiment of a middle layer 20 of the backlight module B. The middle layer 20 is attached to a bottom portion of the first light guide plate 10 and has a light transmitting region 21. The light transmitting region 21 of the middle layer 20 is configured to limit a light exit range of light, such that the light passing through the middle layer 20 can exit only through the light transmitting region 21 so as to provide a light emitting area with a predetermined shape or size. In some embodiments, the shape and size of the light transmitting region 21 of the middle layer 20 are associated with the light emitting shape and size of the second light emitting mode. In these embodiments, an area of the light transmitting region 21 of the middle layer 20 is smaller than or equal to an area of the first microstructure 11. That is, in the second light emitting mode, light passing through the middle layer 20 is limited to exit only from the light transmitting region 21, so that the light emitting range of the second light emitting mode (as shown in FIG. 3) is smaller than the light emitting range of the first light emitting mode (as shown in FIG. 2). In some embodiments, the first microstructure 11 has an outer contour, the area of the first microstructure 11 is calculated according to the outer contour of the first microstructure 11.

Referring to FIG. 5, in some embodiments where the backlight module B is applied to the touchpad A, a position of the light transmitting region 21 of the middle layer 20 corresponds to a top side of the touch circuit board A1. In this case, in the second light emitting mode, the light emitting range corresponding to the light transmitting region 21 is the touchable range of the touch circuit board A1. Thereby, the touch range of the touchpad A can be visually distinguished by the user through the light emitting range. In some embodiments, an area of the light transmitting region 21 of the middle layer 20 is smaller than an area of the touch circuit board A1, thereby ensuring that the whole light emitting range corresponding to the light transmitting region 21 in the second light emitting mode has the touch effect.

Referring to FIG. 5 and FIG. 7, in some embodiments, the part of the middle layer 20 other than the light transmitting region 21 is a light shielding area 22 (shaded area shown in FIG. 7). Specifically, the whole middle layer 20 is made of a light transmitting material, and a non-light transmitting material is arranged at the part other than the light transmitting region 21 to form the light shielding area 22. In some embodiments, the light shielding area 22 may be formed by arranging a black colloid or a coating material of other colors by means of printing or coating.

Figure 8:
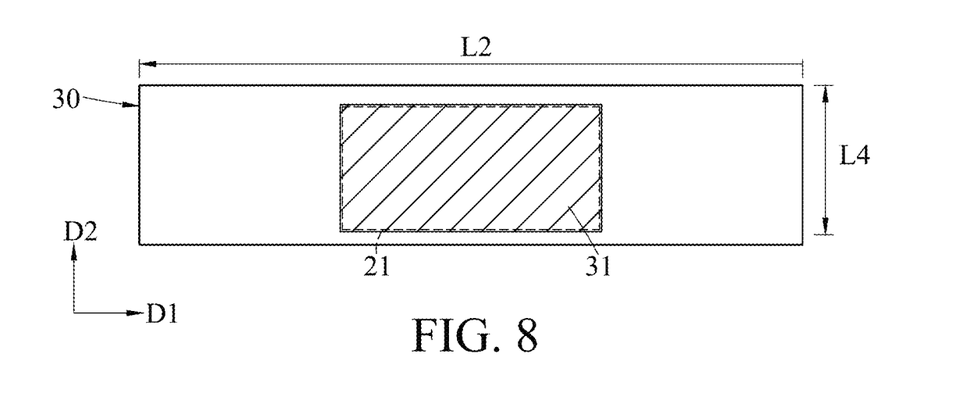
FIG. 8 is a schematic view of an embodiment of a second light guide plate of the backlight module.

Referring to FIG. 5, FIG. 7 and FIG. 8, FIG. 8 is a schematic view of an embodiment of a second light guide plate 30 of the backlight module B. The second light guide plate 30 is attached to a bottom portion of the middle layer 20 and has a second microstructure 31 (shaded area shown in FIG. 8). A position of the second microstructure 31 corresponds to the light transmitting region 21 (dashed box area shown in FIG. 8) of the middle layer 20. An area of the second microstructure 31 is smaller than an area of the first microstructure 11. The second microstructure 31 of the second light guide plate 30 is configured to change the direction of reflection of light and guide the light entering the second light guide plate 30 toward the light transmitting region 21 of the middle layer 20 such that the light exits from the light transmitting region 21. In some embodiments, the shape and size of the second microstructure 31 distributed on the second light guide plate 30 are associated with the shape and size of the light transmitting region 21 of the middle layer 20. In some embodiments, an area of the second microstructure 31 of the second light guide plate 30 is greater than or at least equal to an area of the light transmitting region 21, thereby ensuring that light from the second light emitting element 53 can emit light completely corresponding to the light transmitting region 21. In some embodiments, the second microstructure 31 has an outer contour, the area of the second microstructure 31 is calculated according to the outer contour of the second microstructure 31.

Referring to FIG. 5 and FIG. 8, in some embodiments, the second microstructure 31 is realized by mesh dots or mesh lines printed with ink on a bottom surface of the second light guide plate 30. In some embodiments, the second microstructure 31 may also be formed by a plurality of dots (or mesh dots or light dots), which may be, but not limited to, convex dots or concave dots, and may be of any shape, e.g., an irregular shape, a cone, a square, a triangle, a trapezoid, etc. In these embodiments, the shape and size of the dots, the spacing between the adjacent convex dots, and/or the spacing between the concave dots may be adjusted according to the type of light emitted by the second light emitting mode of the backlight module B or a material of the second light guide plate 30. Thereby, the second light guide plate 30 receives the light emitted from the second light emitting element 53, so that the light of the second light emitting element 53 enters the second light guide plate 30 from the side for total reflection, and is scattered by the second microstructure 31 to provide the predetermined light emitting effect.

Referring to FIG. 5, the bottom layer 40 is attached to a bottom portion of the second light guide plate 30, so as to prevent light entering the first light guide plate 10, the middle layer 20 and the second light guide plate 30 from exiting from the bottom portion of the second light guide plate 30. In some embodiments, the bottom layer 40 is made of a material with light absorbing properties.

In some embodiments, the bottom layer 40 and the light shielding area 22 of the middle layer 20 have the same properties after interacting with the light, so that the backlight module B in the first light emitting mode will not generate light and shadow at the junction of the light transmitting region 21 and the light shielding area 22. In some embodiments, the bottom layer 40 and the light shielding area 22 of the middle layer 20 may have exactly the same color. When the bottom layer 40 and the light shielding area 22 of the middle layer 20 have exactly the same color, the bottom layer 40 and the light shielding area 22 of the middle layer 20 have the same reaction with the light. In this way, in the first light emitting mode, the bottom layer 40 makes up for the difference between the light transmitting region 21 and the light shielding area 22 of the middle layer 20, thereby avoiding generating light and shadow at the junction of the light transmitting region 21 and the light shielding area 22, and maintaining the best state of the first light emitting mode.

Referring to FIG. 5, the first light emitting element 52 and the second light emitting element 53 are respectively located on two surfaces of the circuit board 51. The first light emitting element 52 corresponds to a side surface of the first light guide plate 10. The second light emitting element 53 corresponds to a side surface of the second light guide plate 30. In some embodiments, the first light emitting element 52 contacts the side surface of the first light guide plate 10, or the first light emitting element 52 and the side surface of the first light guide plate 10 have a slit therebetween due to the tolerance generated after assembly. The second light emitting element 53 contacts the side surface of the second light guide plate 30, or the second light emitting element 53 and the side surface of the second light guide plate 30 have a slit therebetween due to the tolerance generated after assembly. It should be noted that the number of the first light emitting elements 52 and the second light emitting elements 53 may be, but not limited to, one or more respectively.

In some embodiments, the circuit board 51 may be, but not limited to, a flexible printed circuit (FPC) or a printed circuit board (PCB). The first light emitting elements 52 and the second light emitting elements 53 may be, but not limited to, light emitting diodes (LEDs). The first light emitting element 52 emits light toward the first light guide plate 10, and the second light emitting element 53 emits light toward the second light guide plate 30.

Referring to FIG. 5, in these embodiments, the first light emitting element 52 and the second light emitting element 53 are arranged on two opposite surfaces of the circuit board 51, and between the two opposite surfaces of the circuit board 51 that are provided with the first light emitting element 52 and the second light emitting element 53 is the side surface of the circuit board 51. Thereby, the side surface of the circuit board 51 abuts against the side surface of the first light guide plate 10, the middle layer 20 or the second light guide plate 30, and the circuit board 51 is parallel to the first light guide plate 10, the middle layer 20, the second light guide plate 30 or the bottom layer 40.

Based on the above, referring to FIG. 2 to FIG. 5, when only the first light emitting element 52 emits light, the light emitted by the first light emitting element 52 passes through the first light guide plate 10 and interacts with the first microstructure 11 to provide the first light emitting mode. When only the second light emitting element 53 emits light, the light emitted by the second light emitting element 53 passes through the second light guide plate 30 and interacts with the second microstructure 31 to provide a second light emitting mode. When the first light emitting element 52 and the second light emitting element 53 emit light at the same time, the light emitted by the first light emitting element 52 and the second light emitting element 53 at the same time respectively passes through the first light guide plate 10 and the second light guide plate 30 and respectively interacts with the first microstructure 11 and the second microstructure 31 to jointly provide the third light emitting mode. Specifically, the area of the first microstructure 11 is greater than the area of the second microstructure 31, so the first light emitting mode with a larger light emitting range, the second light emitting mode with a smaller light emitting range, and the third light emitting mode with overlapped light emission can be presented, thereby providing diversified light emitting modes.

Referring to FIG. 5 to FIG. 8, in some embodiments, the first light guide plate 10, the middle layer 20 and the second light guide plate 30 are all planar structures constructed along a first direction D1 and a second direction D2 perpendicular to each other. In these embodiments, the first light guide plate 10 has a first length L1 in the first direction D1 and a third length L3 in the second direction D2. The second light guide plate 30 has a second length L2 in the first direction D1 and a fourth length L4 in the second direction D2. In some embodiments, the first light guide plate 10 has the first length L1 greater than the third length L3 so as to present a rectangular exterior, and the second light guide plate 30 has the second length L2 greater than the fourth length L4 so as to present a rectangular exterior.

Referring to FIG. 5, in some embodiments, in order to make the middle layer 20 easily attached to the first light guide plate 10 or the second light guide plate 30, the exterior shape and size of the middle layer 20 may correspond to the shape and size of the first light guide plate 10 or the second light guide plate 30. That is, in these embodiments, the first light guide plate 10, the middle layer 20 and the second light guide plate 30 have the same length in the first direction D1, and the first light guide plate 10, the middle layer 20 and the second light guide plate 30 also have the same length in the second direction D2. Thereby, the middle layer 20 can be completely attached to the first light guide plate 10 or the second light guide plate 30.

Referring to FIG. 5, in some embodiments where the first light guide plate 10, the middle layer 20 and the second light guide plate 30 have exactly the same exterior shape and size, edges of the first light guide plate 10, the middle layer 20 and the second light guide plate 30 are aligned. In these embodiments, the first light emitting element 52 and the second light emitting element 53 are arranged on two opposite surfaces of the circuit board 51 and are adjacent to the same side surface of the circuit board 51. That is, in a direction perpendicular to the two surfaces of the circuit board 51 that are provided with the first light emitting element 52 and the second light emitting element 53, the first light emitting element 52 and the second light emitting element 53 overlap in position. Thereby, the first light emitting element 52 can be as close as possible to the first light guide plate 10, and the second light emitting element 53 can be as close as possible to the second light guide plate 30, so that the light emitted by the first light emitting element 52 can directly enter the first light guide plate 10 and the light emitted by the second light emitting element 53 can directly enter the second light guide plate 30, thereby reducing the optical loss and improving the light utilization.

Figure 9:
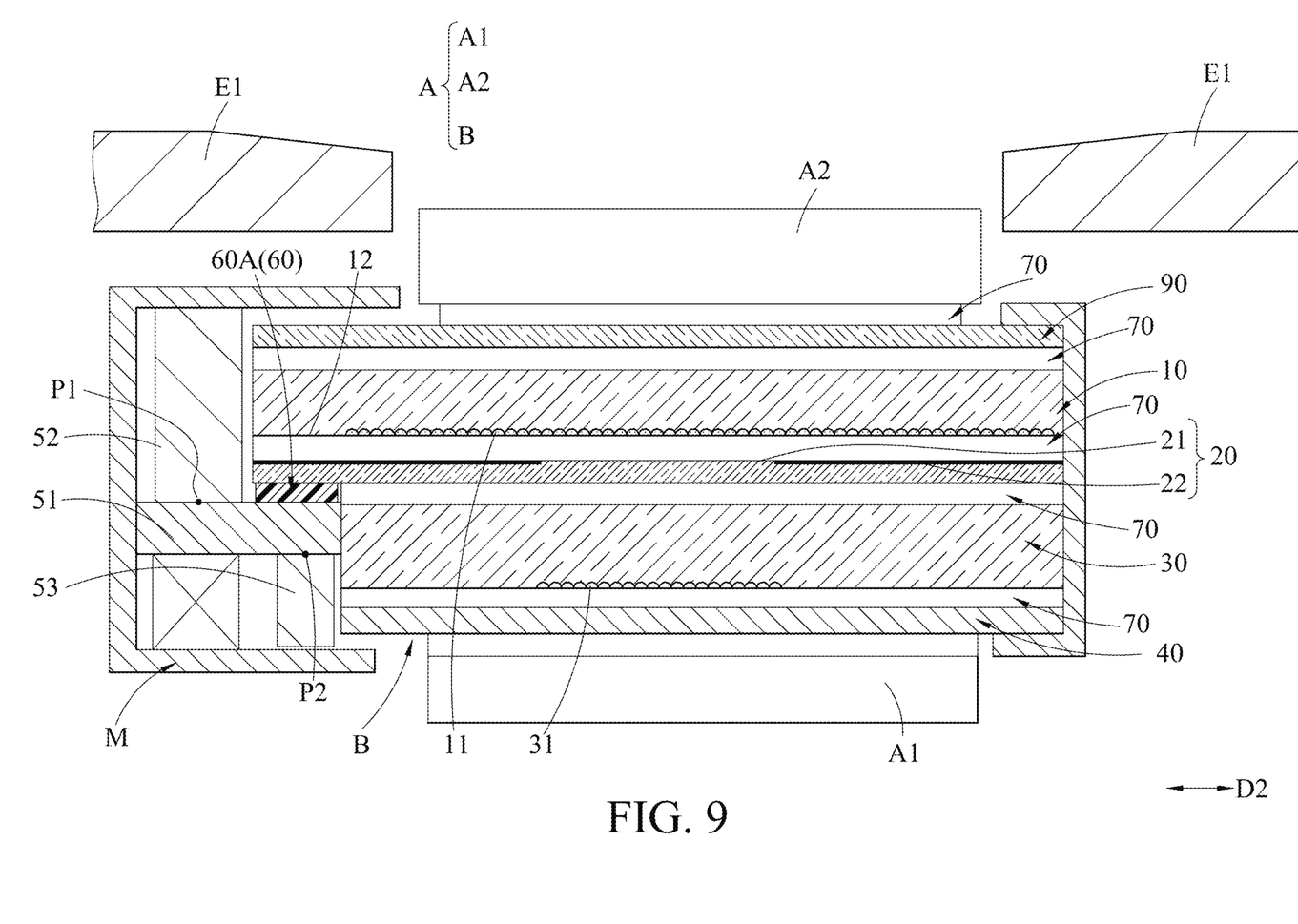
FIG. 9 is a schematic cross-sectional view of a second embodiment of a touchpad.
Figure 10:
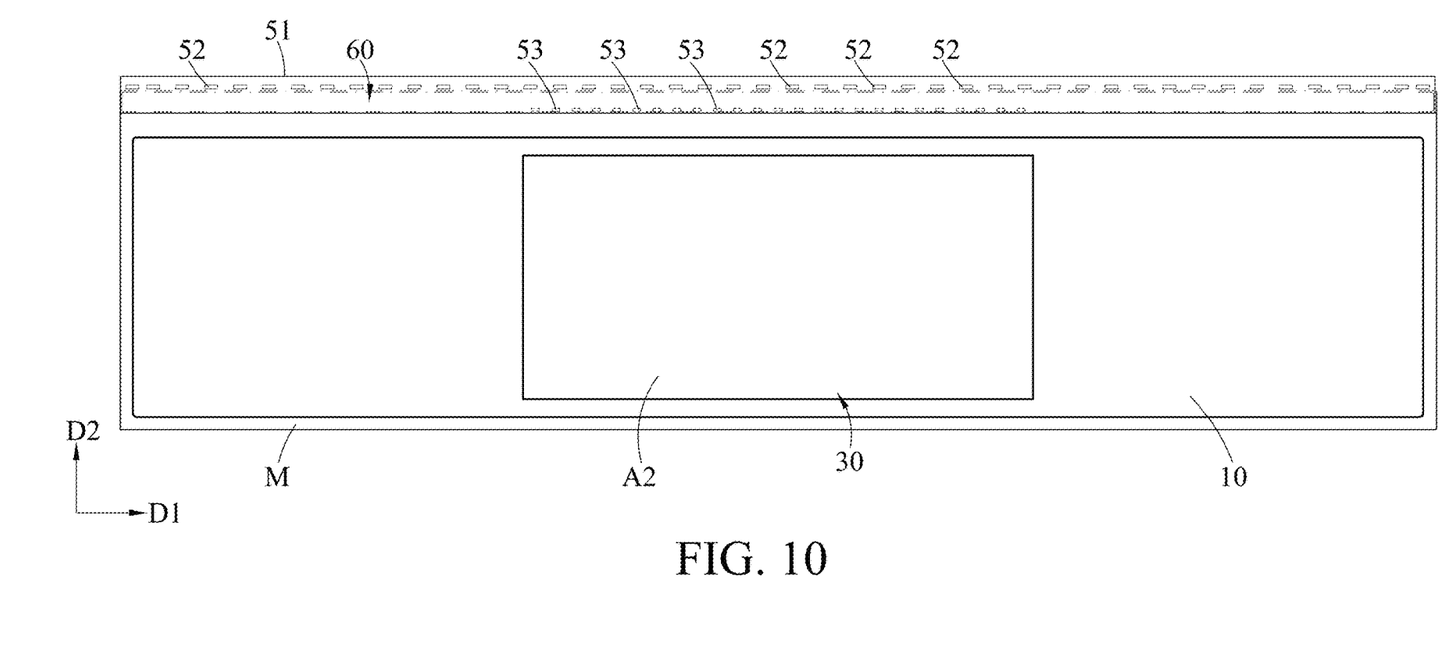
FIG. 10 is a schematic top view of a local structure of the touchpad, in which first light emitting elements on an upper surface of a circuit board are represented by solid lines and second light emitting elements on a lower surface of the circuit board are represented by dashed lines.
Figure 11:
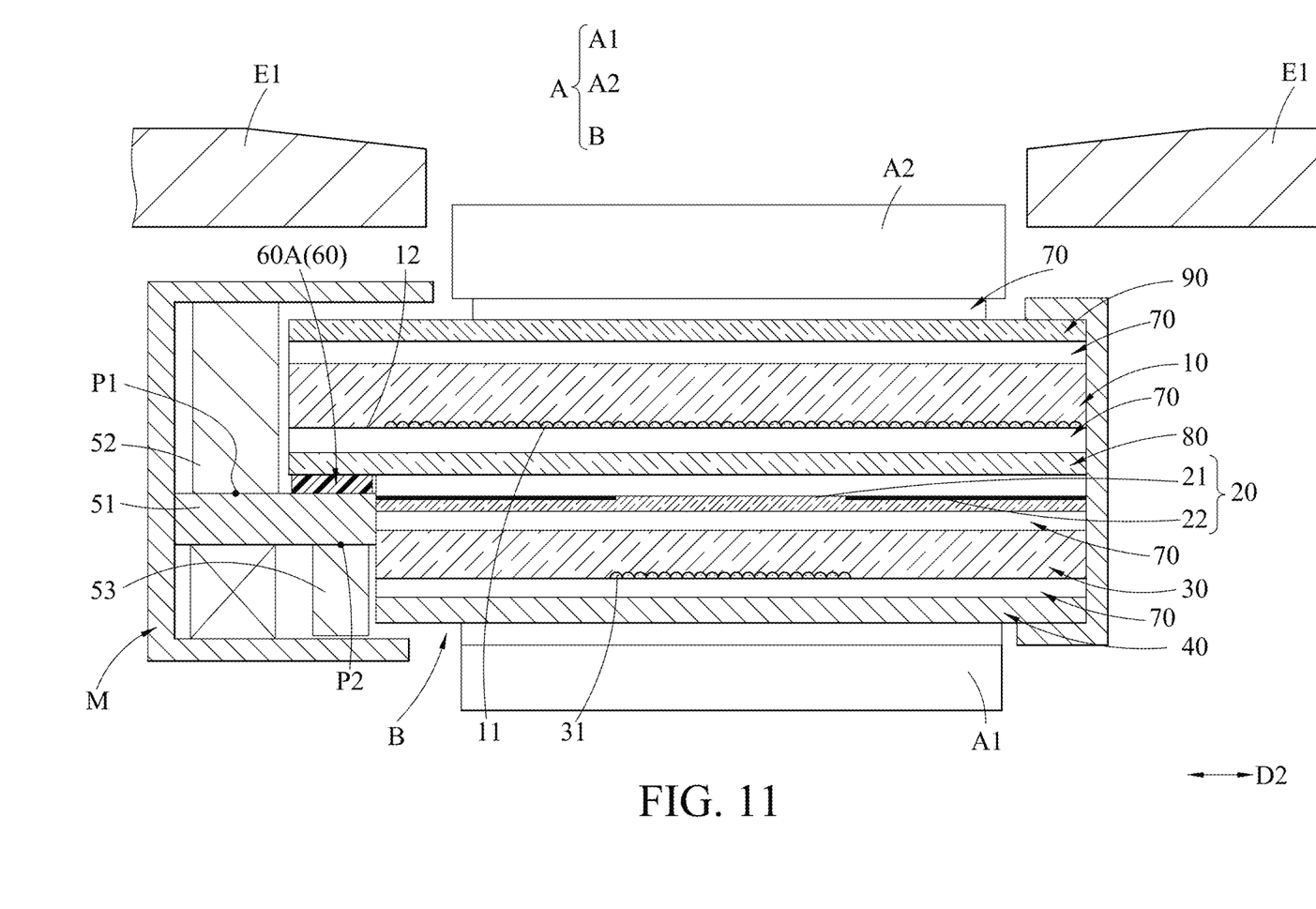
FIG. 11 is a schematic cross-sectional view of a third embodiment of a touchpad.
Figure 12:
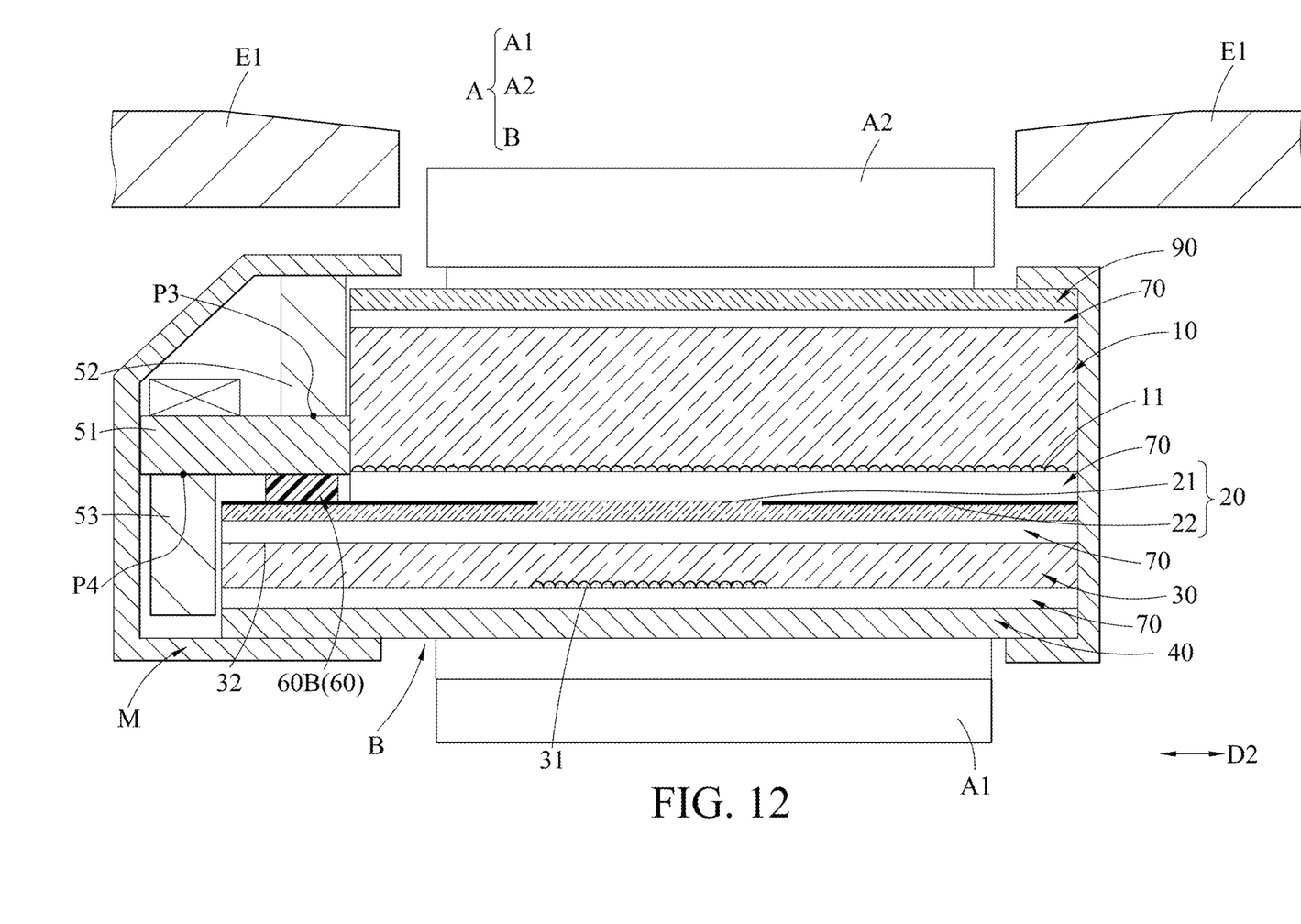
FIG. 12 is a schematic cross-sectional view of a fourth embodiment of a touchpad.
Figure 13:
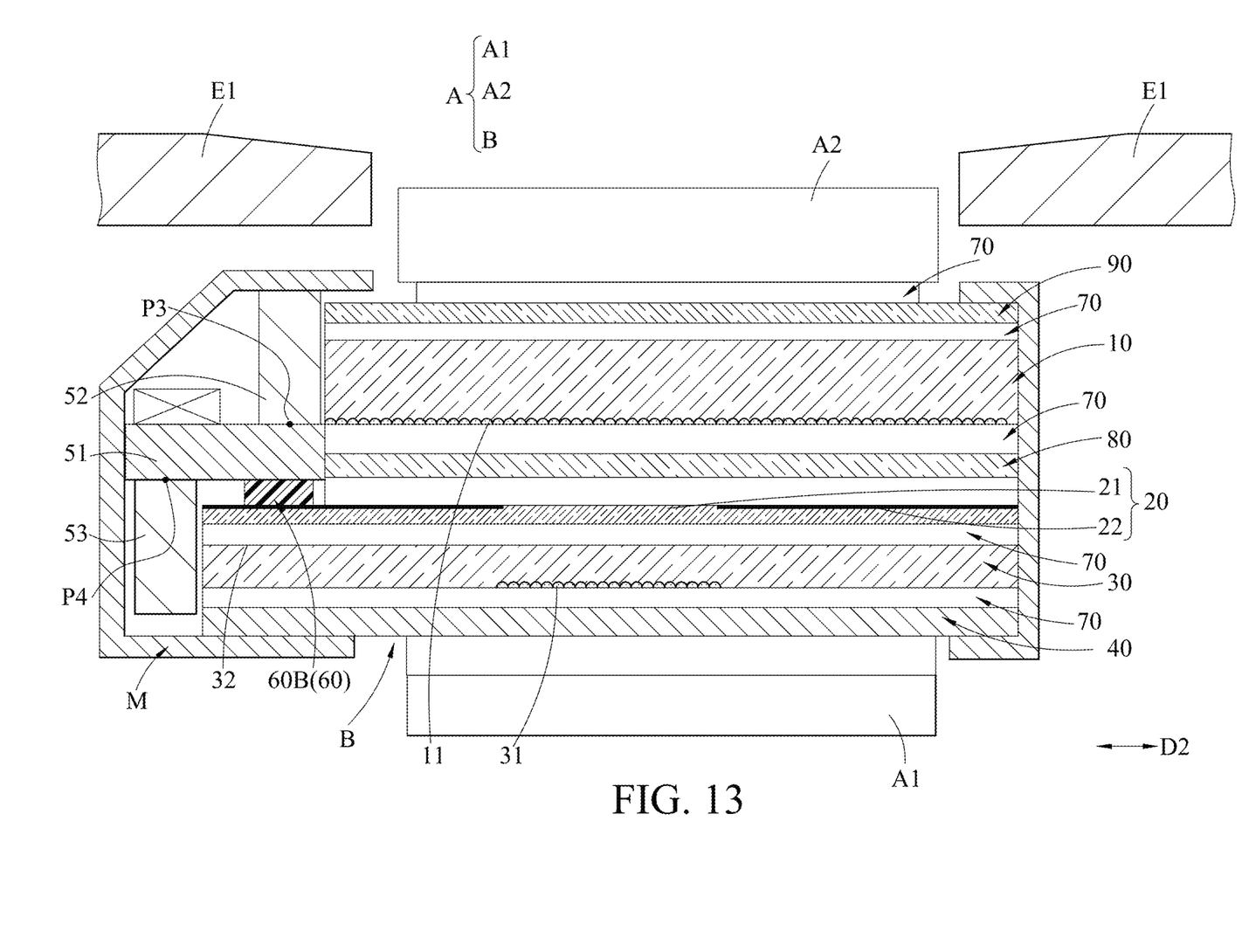
FIG. 13 is a schematic cross-sectional view of a fifth embodiment of a touchpad.

Referring to FIG. 9 to FIG. 13, FIG. 9 is a schematic cross-sectional view of a second embodiment of a touchpad A. FIG. 10 is a schematic top view of a local structure of the touchpad A, in which first light emitting elements 52 on an upper surface of the circuit board 51 are represented by solid lines and second light emitting elements 53 on a lower surface of the circuit board 51 are represented by dashed lines. FIG. 11 is a schematic cross-sectional view of a third embodiment of a touchpad A. FIG. 12 is a schematic cross-sectional view of a fourth embodiment of a touchpad A. FIG. 13 is a schematic cross-sectional view of a fifth embodiment of a touchpad A. In some embodiments, the upper surface of the circuit board 51 shown in FIG. 10 is provided with a plurality of first light emitting elements 52, and the first light emitting elements 52 are represented by solid lines. The lower surface of the circuit board 51 is provided with a plurality of second light emitting elements 53, and the second light emitting elements 53 are represented by dashed lines.

In order to reduce light interference between the first light emitting element 52 and the second light emitting element 53, in the direction perpendicular to the two surfaces of the circuit board 51 that are provided with the first light emitting element 52 and the second light emitting element 53, the first light emitting element 52 and the second light emitting element 53 do not overlap in position (as shown in FIG. 9 or FIG. 12).

Referring to FIG. 9 to FIG. 11, in some embodiments, the first light emitting element 52 is arranged at a first position P1 of the circuit board 51, and the second light emitting element 53 is arranged at a second position P2 of the circuit board 51. The first position P1 is farther from a center position of the middle layer 20 than the second position P2 in the second direction D2. That is, the first light emitting element 52 and the second light emitting element 53 are arranged at different positions on the circuit board 51 in the second direction D2, the first light emitting element 52 and the second light emitting element 53 are staggered on the circuit board 51, a control chip on the circuit board 51 is arranged at a position staggered from the first light emitting element 52 or the second light emitting element 53.

Referring to FIG. 9 to FIG. 11, in these embodiments, the second position P2 is adjacent to a side surface of the circuit board 51 close to the second light guide plate 30, and the second light emitting element 53 can be as close as possible to the side surface of the second light guide plate 30 after being arranged at the second position P2. Since the first light emitting element 52 and the second light emitting element 53 are staggered in the second direction D2, there is a gap between the first position P1 and the side surface of the circuit board 51 close to the second light guide plate 30 in the second direction D2. In order to make the first light emitting element 52 be as close as possible to the side surface of the first light guide plate 10, the first light guide plate 10 further includes a first extending portion 12, and the first extending portion 12 extends along the second direction D2, so that the third length L3 of the first light guide plate 10 in the second direction D2 is greater than the fourth length L4 of the second light guide plate 30 in the second direction D2.

In this way, the first light guide plate 10 can extend over the circuit board 51 to be adjacent to the side surface of the second light emitting element 53 and extend to the first light emitting element 52 to fill the gap between the first position P1 and the side surface of the circuit board 51, so that the first light emitting element 52 can be as close as possible to the first light guide plate 10, thereby reducing the light interference between the first light emitting element 52 and the second light emitting element 53, avoiding the optical loss of the first light emitting element 52 and improving the light utilization.

In some embodiments where the third length L3 of the first light guide plate 10 is not equal to the fourth length L4 of the second light guide plate 30, in order to further avoid light interference between the first light emitting element 52 and the second light emitting element 53, referring to FIG. 10, the backlight module B further includes a light shielding adhesive 60. The light shielding adhesive 60 is attached to the gap on the circuit board 51 adjacent to the first light emitting element 52 or the second light emitting element 53.

In some embodiments, the light shielding adhesive 60 is a non-light transmitting black tape with adhesive on both sides.

Specifically, referring to FIG. 9 and FIG. 11, in some embodiments where the third length L3 of the first light guide plate 10 is greater than the fourth length L4 of the second light guide plate 30, the backlight module B includes a first light shielding adhesive 60A. The first light shielding adhesive 60A is attached between the first extending portion 12 of the first light guide plate 10 and the circuit board 51. Thereby, while the first light shielding adhesive 60A is attached between the circuit board 51 and the first light guide plate 10, light emitted by the first light emitting element 52 can be prevented from going to the second light guide plate 30 via the gap on the circuit board 51 adjacent to the first light emitting element 52, thereby avoiding light interference between the first light emitting element 52 and the second light emitting element 53.

The arrangement of different positions of the first light emitting element 52 and the second light emitting element 53 on the circuit board 51 in the second direction D2 is not limited to the foregoing embodiments. In some embodiments shown in FIG. 12 and FIG. 13, the first light emitting element 52 is arranged at a third position P3 of the circuit board 51, and the second light emitting element 53 is arranged at a fourth position P4 of the circuit board 51. The third position P3 is closer to a center position of the middle layer 20 than the fourth position P4 in the second direction D2.

Referring to FIG. 12, in these embodiments, the third position P3 is adjacent to the side surface of the circuit board 51 close to the first light guide plate 10, so that the first light emitting element 52 can be as close as possible to the side surface of the first light guide plate 10 after being arranged at the third position P3. Since the first light emitting element 52 and the second light emitting element 53 are staggered in the second direction D2, there is a gap between the fourth position P4 and the side surface of the circuit board 51 close to the second light guide plate 30 in the second direction D2. In order to make the second light emitting elements 53 be as close as possible to the side surface of the second light guide plate 30, the second light guide plate 30 further includes a second extending portion 32, and the second extending portion 32 extends along the second direction D2, so that the fourth length L4 of the second light guide plate 30 in the second direction D2 is greater than the third length L3 of the first light guide plate 10 in the second direction D2.

In this way, the second light guide plate 30 can extend over the circuit board 51 to be adjacent to the side surface of the first light emitting element 52 and extend to the second light emitting element 53 to fill the gap between the fourth position P4 and the side surface of the circuit board 51, so that the second light emitting element 53 can be as close as possible to the second light guide plate 30, thereby reducing the light interference between the first light emitting element 52 and the second light emitting element 53, avoiding the optical loss of the second light emitting element 53 and improving the light utilization.

Referring to FIG. 12 and FIG. 13, in some embodiments where the third length L3 of the first light guide plate 10 is smaller than the fourth length L4 of the second light guide plate 30, the backlight module B includes a second light shielding adhesive 60B, and the second light shielding adhesive 60B is attached between the second extending portion 32 of the second light guide plate 30 and the circuit board 51. Thereby, while the second light shielding adhesive 60B is attached between the circuit board 51 and the second light guide plate 30, light emitted by the second light emitting element 53 can be prevented from going to the first light guide plate 10 via the gap on the circuit board 51 adjacent to the second light emitting element 53, thereby avoiding light interference between the first light emitting element 52 and the second light emitting element 53.

Referring to FIG. 9 to FIG. 13, in some embodiments where the third length L3 of the first light guide plate 10 is not equal to the fourth length L4 of the second light guide plate 30, the length of the middle layer 20 in the second direction D2 may be equal to the third length L3 (as shown in FIG. 9) or equal to the fourth length L4 (as shown in FIG. 11 to FIG. 13). In these embodiments, the arrangement of the position of the middle layer 20 may be different, which will be described as follows.

Referring to FIG. 11, in some embodiments where the length of the middle layer 20 in the second direction D2 is equal to the smaller of the third length L3 and the fourth length L4, the side surface of the middle layer 20 is adjacent to the side surface of the circuit board 51. Referring to FIG. 9, FIG. 12 and FIG. 13, in some embodiments where the length of the middle layer 20 in the second direction D2 is equivalent to the larger of the third length L3 and the fourth length L4, a part of the middle layer 20 is laminated between the first light guide plate 10 and the second light guide plate 30, and the remaining part is laminated between the circuit board 51 and the first light guide plate 10 or the second light guide plate 30 which has a greater length in the second direction D2.

Referring to FIG. 9 and FIG. 11 to FIG. 13, in some embodiments, the backlight module B further includes a plurality of attachment members 70 (in the cross-sectional views of FIG. 9 and FIG. 11 to FIG. 13, in order to clearly present the structure of layers, the attachment members 70 are not shown). The first light guide plate 10, the middle layer 20, the second light guide plate 30 and the bottom layer 40 of the backlight module B are attached through the attachment members 70. In these embodiments, the first light guide plate 10 and the middle layer 20, the middle layer 20 and the second light guide plate 30, and the second light guide plate 30 and the bottom layer 40 are respectively attached through the attachment members 70. In some embodiments, the attachment members 70 may be an optically clear adhesive (OCA for short, or optical acrylic adhesive). The optically clear adhesive has the characteristics of high light transmittance, high bonding strength and small curing shrinkage, so that the first light guide plate 10, the middle layer 20, the second light guide plate 30 and the bottom layer 40 can be actually glued without affecting the optical characteristics between the layers.

Referring to FIG. 11 and FIG. 13, in some embodiments, the backlight module B further includes a transflective layer 80, located between the first light guide plate 10 and the middle layer 20. The transflective layer 80 has light reflectivity and light transmittance, and is configured to reflect light from the first light emitting element 52 to the first light guide plate 10 and make light from the second light emitting element 53 pass through the transflective layer 80. In this way, when only the first light emitting element 52 emits light, the transflective layer 80 can reflect the light from the first light emitting element 52 to the first light guide plate 10 before the light exits, thereby forming the first light emitting mode. When only the second light emitting element 53 emits light, the light from the second light emitting element 53 can pass through the second light guide plate 30, the middle layer 20 and the transflective layer 80 and then exit, thereby forming the second light emitting mode. When the first light emitting element 52 and the second light emitting element 53 emit light at the same time, the transflective layer 80 can reflect the light from the first light emitting element 52 and allow the light from the second light emitting element 53 to pass through it, so that the light from the first light emitting element 52 and the second light emitting element 53 can overlap and then exit, thereby forming the third light emitting mode.

Referring to FIG. 11, in some embodiments where the backlight module B includes the transflective layer 80 and the third length L3 of the first light guide plate 10 is greater than the fourth length L4 of the second light guide plate 30, the length of the transflective layer 80 in the second direction D2 is the same as the third length L3 of the first light guide plate 10, and the first light shielding adhesive 60A is attached to a position between the circuit board 51 and the transflective layer 80 corresponding to the first extending portion 12. In these embodiments, the length of the middle layer 20 in the second direction D2 is the same as the fourth length L4 of the second light guide plate 30, and the side surface of the middle layer 20 is attached to the side surface of the circuit board 51.

Referring to FIG. 13, in some embodiments where the backlight module B includes the transflective layer 80 and the third length L3 of the first light guide plate 10 is smaller than the fourth length L4 of the second light guide plate 30, the length of the transflective layer 80 in the second direction D2 is the same as the fourth length L4 of the second light guide plate 30, the length of the middle layer 20 in the second direction D2 is the same as the third length L3 of the first light guide plate 10, and the second light shielding adhesive 60B is attached to a position between the circuit board 51 and the middle layer 20 corresponding to the second extending portion 32.

In some embodiments, the transflective layer 80 is a see through mirror (STM). The transflective layer 80 may be, but not limited to, an optical thin film, a dielectric material, silicone or an epoxy resin adhesive material mixed with titanium dioxide, silicon dioxide or aluminum oxide reflective particles. In some embodiments, the transflective layer 80 may also be a white diffuser having an 80% transmittance and a reflective effect.

Referring to FIG. 9 and FIG. 11 to FIG. 13, in some embodiments, the backlight module B further includes a diffuser 90, arranged on a side of the first light guide plate 10 away from the middle layer 20, i.e., the light exit side of the first light guide plate 10. Thereby, by arranging the diffuser 90 on the light exit side of the first light guide plate 10, the backlight module B can provide uniform light emission.

In some embodiments, the diffuser 90 is made of a material with a high light transmittance (for example, but not limited to, polyethylene terephthalate (PET), polycarbonate (PC) or polymethyl methacrylate (PMMA)), and the diffuser 90 includes a plurality of scattering particles. Light passing through the diffuser 90 interacts with the scattering particles so as to be refracted, reflected and scattered constantly, thereby achieving the effect of uniform light.

Referring to FIG. 5 and FIG. 9 to FIG. 13, in some embodiments, the backlight module B further includes a plurality of light barrier covering members M. The light barrier covering members M are located on a periphery of the whole backlight module B to cover the first light guide plate 10, the middle layer 20, the second light guide plate 30, the circuit board 51, the first light emitting elements 52 and the second light emitting elements 53. In these embodiments, the light barrier covering member M is a non-light transmitting black polyester film (Mylar), thereby reducing the possibility of light leakage from the non-light exit direction of the backlight module B and improving the light emitting effect.

According to the foregoing description, by means of the arrangement of the area of the first microstructure 11 of the first light guide plate 10, the design of the shape of the light transmitting region 21 of the middle layer 20 and the arrangement of the area of the second microstructure 31 of the second light guide plate 30, the light emitting effect of the backlight module B in the first light emitting mode, the second light emitting mode and the third mode can be changed.

In some embodiments, the brightness of the backlight module B in the first light emitting mode and the second light emitting mode may also be adjusted according to needs. Parameters for adjusting the brightness presented by each light emitting mode include one or a combination of the numbers of the first light emitting elements 52 and the second light emitting elements 53, and the thickness of the first light guide plate 10 or the second light guide plate 30, the thickness (light intensity) of the first light emitting elements 52 or the second light emitting elements 53 and the density of the first light emitting elements 52 or the second light emitting elements 53 arranged (as shown in FIG. 10, the spacing between the first light emitting elements 52 is greater than the spacing between the second light emitting elements 53) in each light emitting mode.

For example, in some embodiments where the backlight module B includes a plurality of first light emitting elements 52 and a plurality of second light emitting elements 53, when the first light emitting mode and the second light emitting mode are required to present the same brightness, the brightness presented by the light emitted by the first light emitting elements 52 after passing through the first light guide plate 10 is the same as the brightness presented by the light emitted by the second light emitting elements 53 after passing through the second light guide plate 30.

In these embodiments, the first light emitting elements 52 and the second light emitting elements 53 arranged on the two opposite surfaces of the circuit board 51 have the same light emitting properties, the first light guide plate 10 and the second light guide plate 30 have the same thickness, and the density of the first light emitting elements 52 arranged on the circuit board 51 along the first direction D1 is the same as the density of the second light emitting elements 53 arranged on the circuit board 51 along the first direction D1. Thereby, the first light emitting mode and the second light emitting mode present the same brightness.

In some embodiments, in order to make the backlight module thinner without affecting the brightness presented, the thickness of the first light emitting elements 52, the thickness of the first light guide plate 10 and the density of the first light emitting elements 52 arranged on the circuit board 51 along the first direction D1 are the same as those in the foregoing embodiments. The thickness of the second light emitting elements 53 is reduced (the light intensity is reduced), that is, the thickness of the second light emitting elements 53 is smaller than the thickness of the first light emitting elements 52. The thickness of the second light guide plate 30 is reduced, that is, the thickness of the second light guide plate 30 is smaller than the thickness of the first light guide plate 10. Here, while the thickness of the second light guide plate 30 is reduced, the flux of light entering the second light guide plate 30 is also reduced. Therefore, in order to maintain the brightness presented as in the foregoing embodiments, the number of the second light emitting elements 53 is increased, and the density of the second light emitting elements 53 arranged on the circuit board 51 along the first direction D1 is also increased, thereby making the brightness the same as in the foregoing embodiments and also reducing the overall thickness of the backlight module B to make the backlight module thinner.

Although the disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A backlight module, comprising:
 a first light guide plate, having a first microstructure and a first extending portion;
 a middle layer, attached to a bottom portion of the first light guide plate, the middle layer having a light transmitting region;
 a second light guide plate, attached to a bottom portion of the middle layer, the second light guide plate having a second microstructure, a position of the second microstructure corresponding to the light transmitting region of the middle layer, and an area of the light transmitting region is smaller than or equal to an area of the first microstructure;
 a bottom layer, attached to a bottom portion of the second light guide plate;
 a circuit board;
 a first light emitting element, located on a surface of the circuit board and corresponding to a side surface of the first light guide plate, wherein the first extending portion arranged close to the first light emitting element;
 a second light emitting element, located on an other surface of the circuit board and corresponding to a side surface of the second light guide plate; and
 a first light shielding adhesive, attached between the first extending portion and the circuit board.

2. The backlight module according to claim 1, wherein the first light guide plate has a first length in a first direction, and the second light guide plate has a second length in the first direction, the first length being the same as the second length.

3. The backlight module according to claim 2, wherein the first light guide plate has a third length in a second direction perpendicular to the first direction, and the second light guide plate has a fourth length in the second direction, the third length being the same as the fourth length.

4. The backlight module according to claim 3, wherein a length of the middle layer in the second direction is the same as the third length of the first light guide plate or the fourth length of the second light guide plate.

5. The backlight module according to claim 2, wherein the first light guide plate has a third length in a second direction perpendicular to the first direction, and the second light guide plate has a fourth length in the second direction, the third length being smaller than the fourth length, or the third length being greater than the fourth length.

6. The backlight module according to claim 1, further comprising a transflective layer, located between the first light guide plate and the middle layer.

7. The backlight module according to claim 1, further comprising a plurality of attachment members, attached between the first light guide plate and the middle layer and between the middle layer and the second light guide plate.

8. The backlight module according to claim 1, further comprising a diffuser, located on a side of the first light guide plate away from the middle layer.

9. The backlight module according to claim 1, wherein in a direction perpendicular to the two surfaces of the circuit board, the first light emitting element and the second light emitting element do not overlap.

10. The backlight module according to claim 9, wherein the first light emitting element is arranged at a first position of the circuit board, and the second light emitting element is arranged at a second position of the circuit board, the first position being farther from a center position of the middle layer than the second position.

11. The backlight module according to claim 9, wherein the first light emitting element is arranged at a third position of the circuit board, and the second light emitting element is arranged at a fourth position of the circuit board, the third position being closer to a center position of the middle layer than the fourth position.

12. The backlight module according to claim 1, further comprising a second light shielding adhesive, wherein the second light guide plate has a second extending portion close to the second light emitting element, and the second light shielding adhesive is attached between the second extending portion and the circuit board.

13. The backlight module according to claim 1, further comprising a plurality of light barrier covering member, covering the first light guide plate, the middle layer, the second light guide plate, the circuit board, the first light emitting element and the second light emitting element.

14. The backlight module according to claim 1, wherein one side end of the middle layer is adjacent to one side end of the circuit board or the side end of the middle layer is laminated on one surface of the circuit board.

15. The backlight module according to claim 1, wherein light emitted by the first light emitting element passes through the first light guide plate and interacts with the first microstructure to provide a first light emitting mode, light emitted by the second light emitting element passes through the second light guide plate and interacts with the second microstructure to provide a second light emitting mode, and light emitted by the first light emitting element and the second light emitting element at the same time respectively passes through the first light guide plate and the second light guide plate and respectively interacts with the first microstructure and the second microstructure to jointly provide a third light emitting mode.

16. The backlight module according to claim 1, wherein a brightness of light emitted by the first light emitting element after passing through the first light guide plate is the same as a brightness of light emitted by the second light emitting element after passing through the second light guide plate.

17. The backlight module according to claim 1, wherein a thickness of the first light emitting element is greater than a thickness of the second light emitting element, and a thickness of the first light guide plate is greater than a thickness of the second light guide plate.

18. The backlight module according to claim 1, wherein a density of the first light emitting elements arranged in a first direction is smaller than a density of the second light emitting elements arranged in the first direction.

19. A touchpad, comprising:
   a touch circuit board;
   a backlight module, arranged on a top portion of the touch circuit board, the backlight module comprising:
      a first light guide plate, having a first microstructure and a first extending portion;
      a middle layer, attached to a bottom portion of the first light guide plate, the middle layer having a light transmitting region;
      a second light guide plate, attached to a bottom portion of the middle layer, the second light guide plate having a second microstructure, a position of the second microstructure corresponding to the light transmitting region of the middle layer, and an area of the light transmitting region is smaller than or equal to an area of the first microstructure;
      a bottom layer, attached to a bottom portion of the first light guide plate;
      a circuit board;
      a first light emitting element, located on a surface of the circuit board and corresponding to a side surface of the first light guide plate, wherein the first extending portion arranged close to the first light emitting element;
      a second light emitting element, located on an other surface of the circuit board and corresponding to a side surface of the second light guide plate; and
      a first light shielding adhesive, attached between the first extending portion and the circuit board; and
   a cover plate, located on a top portion of the backlight module.

20. The touchpad according to claim 19, wherein the light transmitting region of the middle layer is smaller than the touch circuit board, an area of the first light guide plate is greater than an area of the cover plate, and an area of the second light guide plate is greater than the area of the cover plate.

* * * * *